United States Patent [19]

Bergström

[11] Patent Number: 5,340,532
[45] Date of Patent: Aug. 23, 1994

[54] METHOD FOR FORMING CERAMIC POWDERS BY TEMPERATURE INDUCED FLOCCULATION

[75] Inventor: Lennart Bergström, Farsta, Sweden
[73] Assignee: Sandvik AB, Sandviken, Sweden
[21] Appl. No.: 51,357
[22] Filed: Apr. 23, 1993

[30] Foreign Application Priority Data

Apr. 30, 1992 [SE] Sweden ................ 9201376-2

[51] Int. Cl.$^5$ ................ B22F 3/12; B22F 3/22
[52] U.S. Cl. ................ 419/38; 419/36; 419/40; 419/44; 419/53; 419/10; 419/13; 419/14
[58] Field of Search ................ 75/228, 229, 230, 235, 75/238, 241; 419/36, 38, 40, 44

[56] References Cited

U.S. PATENT DOCUMENTS

| | | | |
|---|---|---|---|
| 4,541,855 | 9/1985 | Scherer | 65/18.1 |
| 4,721,599 | 1/1988 | Nakamura et al. | 419/23 |
| 4,894,194 | 1/1990 | Janney | 264/109 |
| 5,047,182 | 9/1991 | Sundback et al. | 264/28 |

FOREIGN PATENT DOCUMENTS

0246438A2 11/1987 European Pat. Off.

*Primary Examiner*—Donald P. Walsh
*Assistant Examiner*—John N. Greaves
*Attorney, Agent, or Firm*—Burns, Doane, Swecker & Mathis

[57] ABSTRACT

A method for manufacturing a sintered body by a) forming a slurry comprising a powder mixture, a dispersant providing steric stabilization for the powders and an organic solvent with a possible addition of one or more soluble polymers; b) transferring the slurry into a mold; and c) changing the temperature sufficient to cause gelation of the sterically stabilized suspension to form a green body. The method also includes d) removing the green body from the mold; e) transferring the green body to a chamber where the gelation temperature can be maintained and the pressure decreased to facilitate removal of the solvent to form a dried body; f) heating the body for a time sufficient to substantially remove the dispersant from the body and; g) sintering the body. The sintered body can be an insert for metal cutting tools.

13 Claims, No Drawings

METHOD FOR FORMING CERAMIC POWDERS BY TEMPERATURE INDUCED FLOCCULATION

FIELD OF THE INVENTION

The present invention relates to a method of forming ceramic powders into solid, shaped bodies of complicated shape. By using temperature induced flocculation, bodies with complicated shapes and a high degree of homogeneity can be obtained.

BACKGROUND OF THE INVENTION

It is of utmost importance to be able to control all of the steps used in the processing of ceramic bodies in order to obtain a reliable product. In addition, it should be possible to achieve chemical and microstructural homogeneity in complex shapes thus produced. Further, when several different ingoing components, such as submicron powders, whiskers, platelets, etc., are incorporated in advanced ceramic materials, good homogeneous mixing of such ingredients is a necessity. Such components have a cohesive nature in the dry state. Consequently, good mixing at the particle level is difficult to achieve. In general, the components are mixed with a liquid, a proper dispersant and possibly further additives so that a well dispersed, non-agglomerated ceramic slurry can be made. In this way, it is possible to obtain a very good homogeneous powder mixture. After mixing, a solid-like body often referred to as a green body with a well defined shape is manufactured and ideally, the almost perfect distribution in the slurry is preserved. In addition, the microstructure of the green body, e.g., spatial density variations, pore size distribution and phase homogeneity, have to be carefully controlled.

Present methods of forming ceramic green bodies are deficient in that they generally degrade the chemical and/or microstructural homogeneity of the mass of particles in the suspension which results in more or less decreased material properties. For example, dry pressing after spray-drying of the slurry, often leads to density variations due to non-uniform compaction and a retained agglomerate structure from the spray-dried granules. Further, with all types of drained casting techniques, such as slip casting, pressure casting, pressure filtration and centrifugal casting, the phase homogeneity and the orientation of non-spherical constituents such as whiskers are affected by the liquid flow. In particular, mass-segregation may occur due to differences in particle size and density. Also, whiskers are generally oriented perpendicularly to the flow direction.

Undrained forming methods such as injection molding have the potential to avoid the foregoing problems. However, due to the high viscosity of the polymer matrix, care has to be taken to achieve good mixing. It is also important to ensure proper burn-out of the polymer matrix. Further, the mold has to be designed in a way which takes into account the whisker orientation which often occurs due to high stress fields during the molding process.

Recently, some gel-forming methods have been disclosed. For example, U.S. Pat. No. 4,894,194 ("Janney"), the disclosure of which is hereby incorporated by reference, discloses a method of molding ceramic powders by mixing the ceramic powder with a dispersant and a monomer solution. The mixture is transferred to a mold and the monomer is crosslinked to form a polymer network giving sufficient strength to the ceramic green body. In addition, EP-A-0246438 ("Fanelli") discloses a method of injection molding an aqueous mixture of a gel-forming material, a dispersant and a ceramic powder.

U.S. Pat. No. 4,541,855 ("Scherer"), the disclosure of which is hereby incorporated by reference, discloses a method of forming a glass or ceramic product by direct casting of a non-aqueous sterically stabilized suspension of oxide parities. The method includes adding a chemical agent to the stable suspension to cause delayed gelation presumably by displacing the dispersant after some time. Before the suspension gels, it is transferred to a mold of desired shape.

However, the above gel-forming techniques also have drawbacks. For instance, the gel-forming reaction is more or less irreversible. That means that a green body which does not fulfill any of the required specifications such as shape tolerances or packing density has to be rejected and cannot be remolded. Also, as these forming methods consist of several different components which might interact with each other in an unexpected way, this can lead to aggregation or unwanted suspension properties.

SUMMARY OF THE INVENTION

The invention provides a method for manufacturing a sintered body. The method includes forming a slurry comprising a powder mixture, a dispersant providing steric stabilization for the powders and an organic solvent with or without one or more soluble polymers. Then, the slurry is transferred into a mold and a green body is formed by temperature controlled gelation of the sterically stabilized suspension. The gelation, however, can be made reversible by changing the temperature of the mold containing the slurry. The method also includes removing the body from the mold, transferring the body to a chamber where the gelation temperature can be maintained and the pressure decreased to facilitate removal of the solvent to form a dried body, heating the body for a time sufficient to substantially remove the dispersant from the body, and sintering the body. It should be noted that the gelation step can be carried out by lowering the temperature of the mold. Further, rejected green bodies can be heated to cause reverse gelation of the suspension and form a renewed suspension whereby the process can be repeated using the renewed suspension.

According to various aspects of the method, the dispersant can comprise a polymeric dispersant having a polyester type stabilizing moiety and an acidic and/or basic anchor group. Also, the slurry can include a soluble polymer and this polymer can be of the same type as the stabilizing moiety of the dispersant. The organic solvent can be selected from the group consisting of long chain alcohols, mixtures of alcohols, high-boiling point petroleum solvents and ketones. The powder mixture can comprise ceramic oxides, carbides, nitrides, borides, or mixtures thereof, with or without a binder metal and optionally including conventional sintering aids and/or grain growth inhibitors. For instance, the ceramic powder mixture can comprise at least one of alumina, zirconia, silicon carbide, silicon nitride, or Sialon. Further, the ceramic powder mixture can include fibers and/or whiskers- and/or disc-shaped single crystals and/or submicron particles preferably of silicon carbide and/or carbides, nitrides and/or borides of titanium, tantalum, hafnium and/or niobium.

According to a preferred embodiment, the sintered body can be an insert for metal cutting tools.

DETAILED DESCRIPTION OF THE PREFERRED EMBODIMENTS

The present invention provides a method for molding ceramic powders into green bodies, especially complex and intricately shaped bodies. Further, the invention provides a method for molding ceramic powders into bodies having a homogeneous microstructure and an isotropic orientation of whiskers and/or platelets. In accordance with one aspect of the invention, rejected green bodies can be redispersed and remolded.

The invention provides a method for forming ceramic powders into solid, shaped bodies of complicated shape, such as inserts for metal cutting tools. The method relates to the molding of ceramic powders into green bodies where a gelation and formation of said bodies is induced by reducing the solvency of the added dispersant through a temperature change. The solid, shaped green bodies, which result, are further heated to remove the organic components and then sintered at high temperature to provide fully dense products.

More specifically, the method according to the invention comprises forming a slurry including ceramic powders, a dispersant for the solid phases and an appropriate solvent. The dispersant should adsorb to the powder surface and provide so called steric stabilization with a part of the molecule protruding from the powder surface into the solvent. The resulting slurry should have sufficiently low viscosity at a selected temperature (preferably room temperature) to allow filling of a mold of complicated shape. The slurry is then reversibly transformed to a solid-like gel by a change in temperature, i.e. either an increase or a decrease in temperature. The temperature change causes a decrease in the solvency of the stabilizing moieties of the dispersant and induces flocculation. A polymer of similar type as the stabilizing moieties can be added to increase the strength of the molded green body.

Due to the reversible nature of the gelation process, rejected bodies can easily be redispersed and remolded.

There are several commercially available dispersants which are appropriate for use in the present invention. Generally, the dispersant consists of two parts; an anchor group (A), which sticks to the surface and a stabilizing moiety (B), which protrudes into the solvent and prevents close contact between two adjacent particles. The dispersant can either be of the A-B type or a block copolymer of the A-B-A-B-A-B type. The stabilizing moiety is typically a long chain hydrocarbon with low polarity for dispersion in organic media or a long chain polyethylene oxide chain for dispersion in aqueous media. Preferred dispersants include polymeric substances with a polyester type stabilizing moiety and an acidic and/or basic anchor group.

Hence, the dispersant should employ good solvency in the selected solvent at the mixture temperature. The solvency should decrease by either an increase or decrease of the temperature. This can be examined by measuring the cloud-point temperature, e.g., the temperature where a 1% dispersant solution aggregates and makes the solution cloudy. Preferred solvents include organic based slurries of alcohols and high-boiling point petroleum solvents and ketones.

A polymer of a similar type as the stabilizing moiety of the dispersant can also be added. Since the solvency of this soluble polymer changes with temperature in a similar fashion, the addition of polymer increases the strength of the molded green body.

The ceramic powder(s), the dispersant and the solvent may be combined in any suitable manner. In a preferred embodiment, the slurry is made by dissolving the dispersant in the solvent and then adding the ceramic powder or powders to the solution. Generally, the amount of dispersant used in the mixture is 1-20%, preferably 2-10% by volume and the amount of the ceramic powder 30-65%, preferably higher than 50% by volume. The resultant slurry is then either poured or squeezed into a mold of desired shape in the fluid condition and the temperature is then changed to create a solid-like gel. The temperature change must be sufficiently rapid to ensure homogeneity of the body. The gelation should preferably be completed within one hour. The temperature is held for some time at the gelation temperature to let any tensions relax. The shaped green body is then removed from the mold and transferred to a drying chamber, e.g., a freeze drier where the gelation temperature can be maintained and the gas pressure controlled to remove the organic solvent. After said drying, the green body is further slowly heated, preferably to a temperature $>500°$ C. for a time sufficient to substantially remove said organic dispersant, subsequently sintered to a dense product and, if necessary, slightly ground or after treated in any other conventional way.

The invention can be applied to the manufacture of all kinds of ceramic bodies preferably from powder mixtures containing ceramic oxides, carbides, nitrides, borides or mixtures thereof with or without a binder metal. The ceramic powder mixture most preferably contains aluminum oxide, zirconium oxide, silicon carbide, silicon nitride or Sialon. The invention is particularly suitable in the manufacture of ceramic composites reinforced with whiskers and/or platelets as well as containing fibers and/or submicron particles. In this case, the ceramic powder mixture is preferably based on aluminum oxide, zirconium oxide or silicon nitride and the whiskers- and/or disc-shaped single crystals preferably comprise silicon carbide or carbides, borides and/or nitrides of titanium, tantalum, hafnium and/or niobium. The ceramic powder mixtures also contain, when necessary, sintering promoting agents, grain growth inhibitors and/or other additives.

The invention has been described with reference to the manufacture of ceramic bodies. However, the method of the invention can be applied generally within the field of powder metallurgy for the manufacture of bodies of cemented carbides, titanium based carbonitride alloys, sintered iron, and other products produced by powder metallurgical techniques. In the case of powders having high density, such as tungsten carbide, care has to be taken to avoid segregation by sedimentation.

The following examples are presented to illustrate features of the invention and advantages thereof. It should be understood, however, that the invention is not limited to the specific details of the Examples.

EXAMPLE 1

A concentrated slurry was prepared by mixing 22 parts by volume alumina A16SG (Aluminum Company of America, USA), 3 parts per volume of Hypermer KD-3 (a proprietary dispersant with a polyester type stabilizing moiety supplied by ICI Inc.) and 15 parts per volume of pentanol as a solvent. The slurry was thoroughly mixed and finally treated with an ultrasonic horn. The slurry comprised about 55 vol % solids and could be poured into a mold. The temperature was decreased to −20° C. for 60 minutes. The gelled green body was removed from the mold and dried in a freeze-drier at a pressure of 100–1000 Pa. The dried green body was heat treated at 550° C. to remove the organic dispersant. The heat treated body was sintered at 1600° C. in air to full density.

EXAMPLE 2

A concentrated slurry was prepared by mixing 13 parts by volume alumina, 5 parts per volume silicon carbide whiskers, 2 parts per volume of the dispersant Hypermer KD-3, and 20 parts per volume of the solvent pentanol. The slurry was thoroughly mixed and finally treated with an ultrasonic horn. The slurry comprised about 45 vol % solids. The slurry was transferred to a mold and cooled to −20° C. for 60 minutes and the green body obtained removed and dried as described in Example 1. The dried body was treated in a combined debinding and presintering cycle in a graphite furnace. The final temperature was 1300° C. and the furnace atmosphere was hydrogen. The presintered body was dipped with a suction cup in a BN-slurry and then in a mullite slurry according to the Swedish patent application 9004134-4. The dipping was performed in such a way that the first half of the body was dipped in the BN-slurry, whereafter the layer was allowed to dry and then the other half was dipped. The body, which now was surrounded by a covering of a BN-layer over which a covering of a mullite layer was provided, was placed in a glass powder bed and after that sintered by isostatic pressing at high temperature. Before the isostatic pressing, the glass was melted in order to isolate the body from the overpressure in the furnace. The sintering was performed at 1550° C. and 160 MPa.

EXAMPLE 3

A concentrated slurry was prepared by mixing 18 parts per volume silicon nitride (SN E-10, UBE, Japan) with 6 wt % yttria and 2 wt % alumina included, 2 parts per volume of the dispersant Hypermer KD-3 and 20 parts per volume of pentanol. The slurry was mixed and treated with an ultrasonic horn. The slurry comprised about 45 vol % solids. At about 30° C. the slurry showed a fluid behavior and could be poured into a mold. The temperature was decreased to −20° C. for 60 minutes and the green body obtained removed, dried and heat treated as described in Example 1. The heat treated body was sintered to full density at 1850° C. in a nitrogen atmosphere.

EXAMPLE 4

Example 1 was repeated. After removal from the mold the gelled green body was transferred to a beaker and the temperature increased to 30° C. As a result the green body was transformed to a pourable suspension which could be remolded.

The foregoing has described the principles, preferred embodiments and modes of operation of the present invention. However, the invention should not be construed as being limited to the particular embodiments discussed. Thus, the above-described embodiments should be regarded as illustrative rather than restrictive, and it should be appreciated that variations may be made in those embodiments by workers skilled in the art without departing from the scope of the present invention as defined by the following claims.

What is claimed is:

1. A method for manufacturing a sintered body, comprising steps of:
    a) forming a slurry comprising a powder mixture, a dispersant providing steric stabilization for said powders and an organic solvent with or without one or more soluble polymers;
    b) transferring said slurry into a mold;
    c) effecting temperature controlled gelation of the sterically stabilized suspension to form a green body, said gelation being effected by reducing solvency of said dispersant due to a change in the temperature of said slurry and said gelation being reversible by changing the temperature of said slurry;
    d) removing said body from said mold;
    e) transferring said body to a chamber where the gelation temperature can be maintained and the pressure decreased to facilitate removal of the solvent to form a dried body;
    f) heating said body for a time sufficient to substantially remove said dispersant from said body; and
    g) sintering said body.

2. A method according to claim 1, wherein said dispersant comprises a polymeric dispersant having a polyester type stabilizing moiety and an acidic and/or basic anchor group.

3. A method according to claim 2, wherein said slurry includes said polymer and said polymer is of the same type as the stabilizing moiety of the dispersant.

4. A method according to claim 1, wherein said organic solvent is selected from the group consisting of long chain alcohols, mixtures of alcohols, high-boiling point petroleum solvents and ketones.

5. A method according to claim 1, wherein said powder mixture comprises ceramic oxides, carbides, nitrides, borides, or mixtures thereof, with or without a binder metal and optionally including conventional sintering aids and/or grain growth inhibitors.

6. A method according to claim 5, wherein said ceramic powder mixture comprises at least one of alumina, zirconia, silicon carbide, silicon nitride, or Sialon.

7. A method according to claim 5, wherein said ceramic powder mixture includes fibers and/or whiskers- and/or disc-shaped single crystals and/or submicron particles preferably of silicon carbide and/or carbides, nitrides and/or borides of titanium, tantalum, hafnium and/or niobium.

8. A method according to claim 1, wherein said sintered body is an insert for metal cutting tools.

9. A method according to claim 1, wherein said gelation step is carried out by lowering the temperature of said mold.

10. A method according to claim 1, wherein the green body is heated to reverse gelation of the suspension and form a renewed suspension and steps (a) through (c) are repeated using the renewed suspension.

11. A method according to claim 1, wherein the solvent comprises pentanol.

12. A method according to claim 1, wherein the gelation step is carried out by maintaining the slurry at a temperature above a freezing temperature of the solvent.

13. A method according to claim 1, wherein the gelation step forms a solid-like gel.

* * * * *